(12) United States Patent
Nakano

(10) Patent No.: US 7,271,546 B2
(45) Date of Patent: Sep. 18, 2007

(54) LIGHTING DEVICE FOR DIELECTRIC BARRIER DISCHARGE LAMP

(75) Inventor: Hiroki Nakano, Imabari (JP)

(73) Assignee: Harison Toshiba Lighting Corporation, Imabari-shi, Ehime (JP)

(*) Notice: Subject to any disclaimer, the term of this patent is extended or adjusted under 35 U.S.C. 154(b) by 0 days.

(21) Appl. No.: 10/483,565

(22) PCT Filed: Jul. 15, 2002

(86) PCT No.: PCT/JP02/07181

§ 371 (c)(1),
(2), (4) Date: Jul. 2, 2004

(87) PCT Pub. No.: WO03/009649

PCT Pub. Date: Jan. 30, 2003

(65) Prior Publication Data

US 2004/0239260 A1    Dec. 2, 2004

(30) Foreign Application Priority Data

Jul. 16, 2001    (JP)    ............................. 2001-250880

(51) Int. Cl.
*H05B 37/02*    (2006.01)

(52) U.S. Cl. .................. 315/246; 315/291; 315/7; 315/257; 315/344; 363/133

(58) Field of Classification Search .................. 315/246
See application file for complete search history.

(56) References Cited

U.S. PATENT DOCUMENTS 5,117,160 A * 5/1992 Konda et al. ................ 315/326
5,309,350 A * 5/1994 Kijima ........................ 363/133
5,325,024 A * 6/1994 Piejak et al. ................ 315/248
5,567,997 A * 10/1996 Suzuki et al. ............... 307/127
5,675,491 A * 10/1997 Kijima ........................ 363/133
5,822,201 A * 10/1998 Kijima .......................... 363/25
6,094,015 A * 7/2000 Wessels et al. ............. 315/291
6,111,359 A * 8/2000 Work et al. ................... 315/56
6,331,064 B1  12/2001 Nishiyama .................. 362/260
6,614,185 B1* 9/2003 Nishimura et al. ......... 313/607
6,674,250 B2* 1/2004 Cho et al. .................... 315/291

FOREIGN PATENT DOCUMENTS

| DE | 35 18 299 | 11/1986 |
| EP | 059 311 | 10/1992 |
| EP | 0 593 311 | 4/1994 |
| GB | 2275140 | 8/1994 |
| JP | 1-134938 | 9/1989 |

(Continued)

*Primary Examiner*—Don Wong
*Assistant Examiner*—Binh Van Ho
(74) *Attorney, Agent, or Firm*—Banner & Witcoff, Ltd.

(57) ABSTRACT

This invention aims to decrease the leakage current of a dielectric barrier discharge lamp, and to prevent generation of the luminance slope between both electrodes. Electrodes 3 and 4 are formed in the outer surface of the dielectric barrier discharge lamp 1, and the high voltage side of the high frequency power sources 5 and 6 is connected to the electrodes 3 and 4, respectively. The low voltage side of the high frequency power sources 5 and 6 is connected to the grounding voltage GND. The output voltage waveform of the high frequency power sources 5 and 6 have different phases each other and inverted polarities each other.

26 Claims, 7 Drawing Sheets

FOREIGN PATENT DOCUMENTS

| | | |
|---|---|---|
| JP | 2-109296 | 4/1990 |
| JP | 4-36997 | 2/1992 |
| JP | 9-167690 | 6/1997 |
| JP | 2000-162593 | 6/2000 |
| JP | 2000-285867 | 10/2000 |
| JP | 2000-323289 | 11/2000 |
| JP | 2001-110587 | 4/2001 |
| JP | 2001-126937 | 5/2001 |
| JP | 2002-8408 | 1/2002 |
| WO | WO 01/79922 | 10/2001 |

\* cited by examiner

LIGHTING DEVICE FOR DIELECTRIC BARRIER DISCHARGE LAMP

This application is a National Stage application of co-pending PCT application PCT/JP02/07181 filed Jul. 25, 2002, which claims the benefit of Japanese application Ser. No. 2001-250880 filed Jul. 16, 2001. These applications are incorporated herein by reference in their entireties.

FIELD OF INVENTION

The present invention relates to a lighting device for dielectric barrier discharge lamp a kind of a discharge lamp, in which a phosphor is excited by an ultraviolet ray radiated by a dielectric barrier discharge of a discharge gas enclosed in a discharge vessel resulting in a radiation of visible light.

BACKGROUND TECHNOLOGY

Fluorescent lamps are used as a light source for reading a copy in information equipments such as facsimile, copying machine, image reader, and a display light source for a large size color display device, electronic sign board. As a conventional fluorescent lamp used for such applications, a so-called inner electrode type fluorescent lamp is known, having a lamp bulb in which a pair of electrodes are provided on both ends and a discharge medium such as rare gas etc. is enclosed. However, this kind fluorescent lamp has such drawbacks that the luminance distribution along the axis of the bulb is not uniform, that the end portions of the bulb turn black resulting in the decrease of effective light emitting length, and that the life is short. On the other hand, a so-called external electrode type dielectric barrier discharge lamp having a lamp bulb, in which a pair of external electrodes are provided on both ends is also used for the above mentioned applications. This kind of fluorescent lamp has a more uniform luminance distribution along the bulb axis by containing mercury gas than the inner electrode type fluorescent lamp, and has advantages that the bulb ends do not turn black, and the life is rather long.

Figure 1:
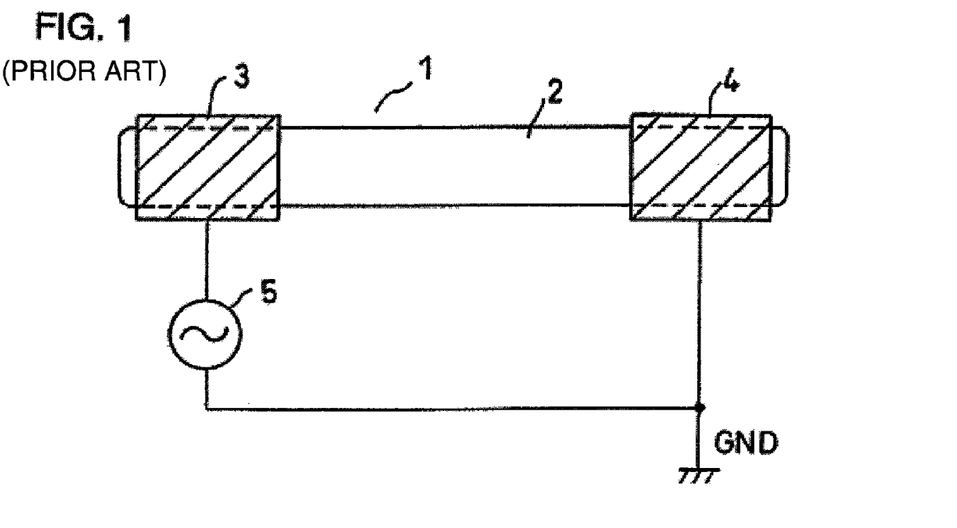
FIG. 1 shows a general construction of a conventional lighting device for a dielectric barrier discharge lamp.

Such dielectric barrier discharge lamp is operated by a lighting device shown in FIG. 1. A dielectric barrier discharge lamp 1 has such a structure that a phosphor film is formed on the inner surface of a dielectric tubular glass bulb 2 and rare gas such as neon or argon etc. and metal vapor such as mercury etc. are enclosed inside the glass bulb. Also, electrodes 3 and 4 are provided on outer surface of the both ends of the tubular glass bulb 2. These electrodes 3 and 4 are formed by winding a conductor composed of for example aluminum (Al) etc. along the circumference direction of the bulb. A high frequency power source 5 is connected between the pair of electrodes 3 and 4, with one electrode 4 being connected with the ground potential GND.

When a voltage is applied between the electrodes 3 and 4 by the power source 5, a high frequency electromagnetic field is generated between the electrodes through an electrostatic capacity between the electrodes. With the high frequency electromagnetic field, metal vapor such as mercury enclosed in the glass bulb 2 is excited to radiate the ultraviolet ray. This ultraviolet ray excites the phosphor deposited on an inner surface of the glass bulb 2 to generate a visible light, which is radiated out of the glass bulb 2.

Figure 2:
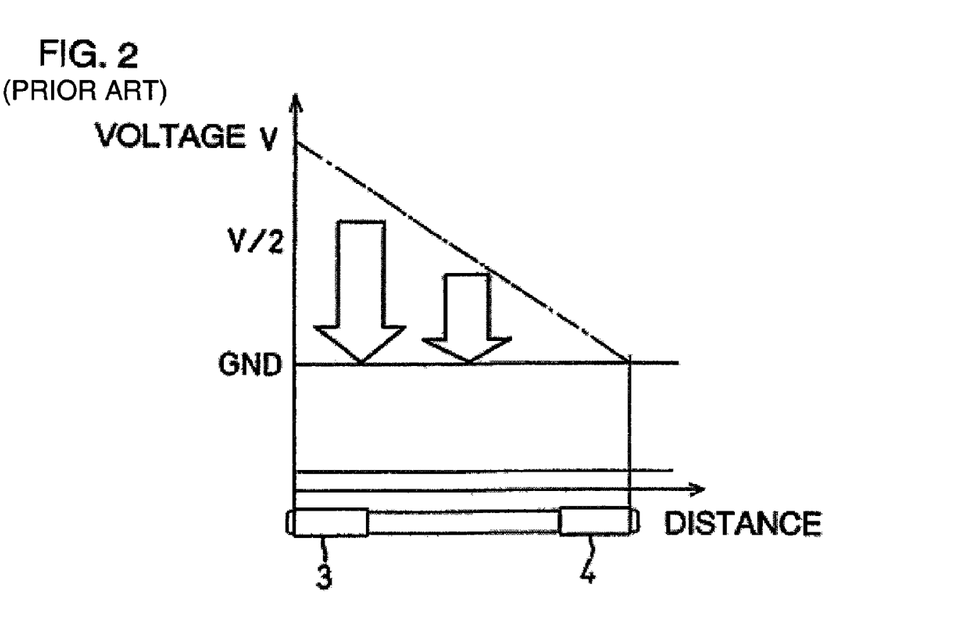
FIG. 2 is a graph showing a relation between an electrode to electrode distance and a voltage for explaining an operation of the conventional lighting device for a dielectric barrier discharge lamp.

The lighting method of the discharge lamp shown in FIG. 1 is called one side high voltage lighting method, because a high voltage of for example 2000 to 3000 V is applied on only one side of the pair of electrodes 3 and 4. With the configuration, a high voltage potential difference V is generated between the electrodes on both ends of the lamp, which is descended linearly from high voltage at the electrode 3 V to the ground potential GND at the electrode 4 as shown in FIG. 2. Such high potential difference between both ends of the lamp generates a leakage current. This leakage current is a phenomenon that a current flowing through the tubular glass bulb 2 from one electrode 3 to another electrode 4 leaks to the ground potential GND in the midway and the leakage current increases as the potential difference increases. For this reason, when a lamp is lighted by the lighting method shown in FIG. 1 and FIG. 2, the current flowing through the tubular glass bulb 2 shows current difference between the high voltage side and the GND side. Thus, according to the one side high voltage lighting method, a so-called luminances lope occurs in which the luminance of the lamp decreases from the high voltage end to the GND end of the tubular glass bulb.

Besides, there was a problem in conventional one side high voltage lighting method, that ozone is produced around the high voltage electrodes because such a high voltage for example as 2000 to 3000 V is applied to the electrode 3.

Further, in conventional one side high voltage lighting method, because the potential difference between both electrodes is great, it is confirmed that the temperature difference around the electrodes occur giving a bad effect upon the lamp action.

Therefore, it is an object of the present invention to eliminate the problems mentioned above, to prevent the luminance slope due to the leakage current based on the high voltage drive, and to supply a lighting device for dielectric barrier discharge lamp capable of obtaining almost uniform and sufficient luminance along the tube axis of the lamp bulb.

DISCLOSURE OF THE INVENTION

The lighting device for a dielectric barrier discharge lamp according to the present invention includes, a dielectric barrier discharge lamp composed of a lamp bulb inside which a discharge gas is enclosed and a pair of electrodes are provided on the outer surface of both ends, a first and a second high frequency voltage sources connected between a ground potential and each of the pair of electrodes of the discharge lamp, the first and the second high frequency voltage sources supplying to the pair of electrodes with a first and a second high frequency voltages having different phases with each other.

Further, in the lighting device for a dielectric barrier discharge lamp according to the present invention, the first and the second high frequency voltages are the sine wave voltages of the same frequency.

Further, in the lighting device for a dielectric barrier discharge lamp according to the present invention, the first and the second high frequency voltages have the same periods, different polarities and the same amplitudes with each other.

Further, in the lighting device for a dielectric barrier discharge lamp according to the present invention, an inverter circuit is included, which includes a switching circuit which is supplied with a DC voltage by the DC source, an inverter transformer having a primary coil which is supplied with an output of the switching circuit, and a secondary coil the center tap of which is connected with the ground potential and a tertiary coil which generates feedback signal to the input side of the switching circuit, wherein the first and the second high frequency voltages which are generated by the secondary coil of the inverter transformer which has a grounded center tap, and coils on the both sides are supplied with AC voltages having inverted phases with each other.

Further, in the lighting device for a dielectric barrier discharge lamp according to the present invention, the dielectric barrier discharge lamps are composed of a plurality of dielectric barrier discharge lamps connected in parallel or connected in series with each other.

Further, in the lighting device for a dielectric barrier discharge lamp according to the present invention, the plurality of dielectric discharge lamps are arranged nearly parallel with each other, the both ends of them are supported by being inserted into a pair of electrodes formed by electric conductive silicone rubber which are arranged by extending accross the bulb axis direction of the dielectric discharge lamps, the pair of electrodes formed by electric conductive silicone rubber are connected with the output ends of secondary coil of the inverter transformer.

Further, the lighting device for a dielectric barrier discharge lamp according to the present invention includes a transistor switching circuit which is supplied with a DC voltage is supplied, and a 1-input 2-output inverter transformer having a primary coil which is supplied with an output of the switching circuit, and a secondary coil a center tap of which is connected with the ground potential and a tertiary coil which generates a feedback signal to an input side of the switching circuit, wherein on the output ends of the coils arranged on the both sides of the center tap of the inverter transformer. AC voltages having inverted phases with each other are generated.

DETAILED DESCRIPTION OF THE INVENTION

Figure 3:
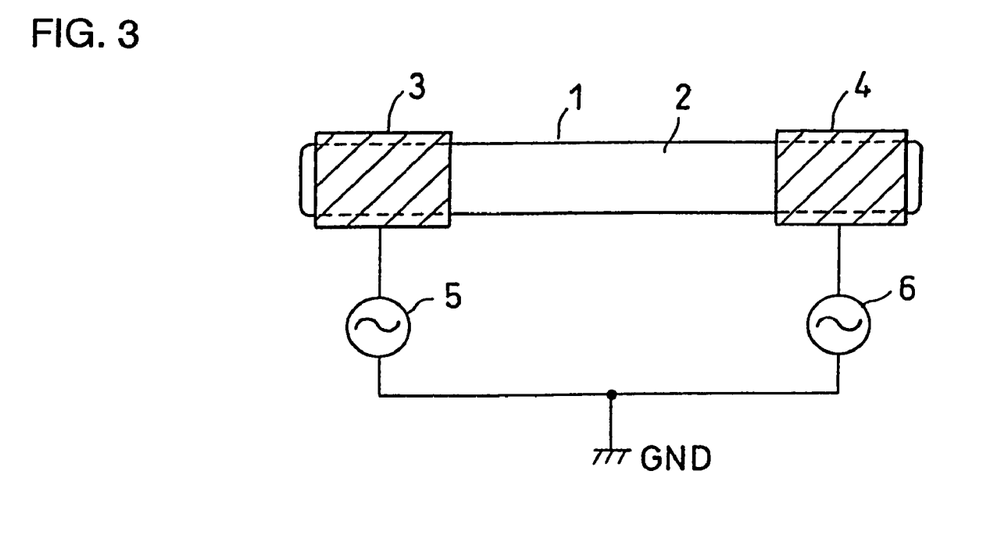
FIG. 3 shows a general construction of a lighting device for a dielectric barrier discharge lamp according to the present invention.
Figure 4:
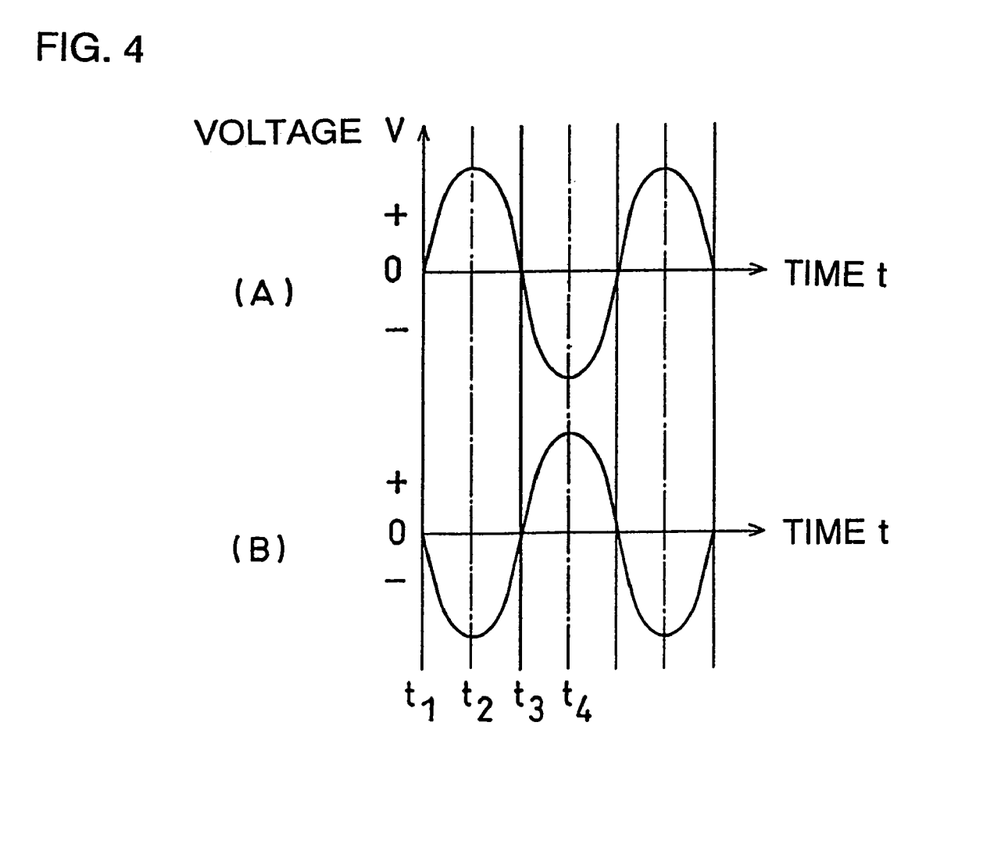
FIG. 4 shows a waveform of an output voltage of a high frequency source in the dielectric barrier discharge lamp according to the present invention.

The embodiments of the present invention will be explained below referring to the figures. FIG. 3 is a general circuit diagram of a lighting device for a dielectric barrier discharge lamp, FIG. 4 is a waveform diagram of an output voltage of a high frequency source. First, in FIG. 3, a dielectric barrier discharge lamp 1 has a structure in which a phosphor film is formed on the inner surface of a straight tubular glass bulb 2. Electrodes 3 and 4 are provided on the both ends of outside the glass bulb 2. Rare gas is enclosed in the discharge space inside the glass bulb 2. As an enclosed gas, a single gas or a mixed gas is used which is selected from the rare gas such as, for example, neon, argon, helium, krypton, xenon etc. The electrodes 3 and 4 are formed with an aluminum tape having a designated width wound at designated positions of the both ends of the glass bulb 2 along the circumference direction. Inside the glass bulb 2, a layer made of such material, as for example, $SiO_2$, $TiO_2$, Ag, having a high reflection characteristics, may be provided. A transparent insulator film coating (not illustrated) composed of silicone resin or PET resin etc. is provided on the outer surface of the electrodes 3 and 4 to prevent a short circuit accident between the electrode 3 and 4. Here, a metal tape such as silver tape or a conducting paint such as silver paste other than aluminum tape, may be used as the electrodes 3 and 4.

The first high frequency power source 5 is connected between one electrode 3 and the GND and the second high frequency power source 6 is connected between the other electrode 4 and the GND.

Next, the operation of the embodiment of the present invention thus arranged will be explained below.

In the dielectric barrier discharge lamp 1 the glass bulb 2 serves as a dielectric substance as well, and thus discharge is performed through the glass that is a dielectric substance. When high frequency AC voltages are supplied from the first and the second high frequency source 5 and 6 to each electrodes 3 and 4, the current does not flow directly from the electrodes 3 and 4 into the discharge space in the glass bulb 2, but the current flows through the dielectric substance made of the glass, which lies between the discharge space and the electrodes 3 and 4 and acts as a capacitor. That is, on an inner surface of the glass bulb 2, electric charge having equal quantity and opposite sign to that of on an outer surface of the glass bulb 2 facing the electrodes 3 and 4 is induced by the polarization of the glass and discharge occurs between the outer and the inner surface of the glass bulb through the discharge space. The charges induced on the inner face of the glass bulb 2 are neutralized by the charges moved by the discharge, decreasing the electric field in the discharge space, so the discharge current stops to flow even if the voltage is applied continuously to the electrodes 3 and 4. However, if the applied voltage increases further, the discharge current continues. If the discharge ends after once discharge occurred, the discharge does not resume until the polarity of the applied voltage is reversed. That is, the current flows only right after the polarity of the applied voltage is reversed and the discharge occurs. Other than the time, the current stops to flow while the charges are the accumulated on the surface of the glass bulb 2. Because rare gas such as neon or argon is enclosed inside the bulb 2, atoms constituting the rare gas are excited to a resonant level by collision with electrons during the discharge described, the excited atoms in resonant level collide with atoms of rare gas in other base level to form an excimer of 2-atom molecule due to a high pressure of the rare gas. This excimer radiates ultraviolet ray and returns to two rare gas atoms at base level. The ultraviolet ray radiated by excimer is converted into visible light by a phosphor and emits high luminance light, since it does not exhibit self-absorption which is ordinary in resonant ultraviolet ray of atoms.

Figure 5:
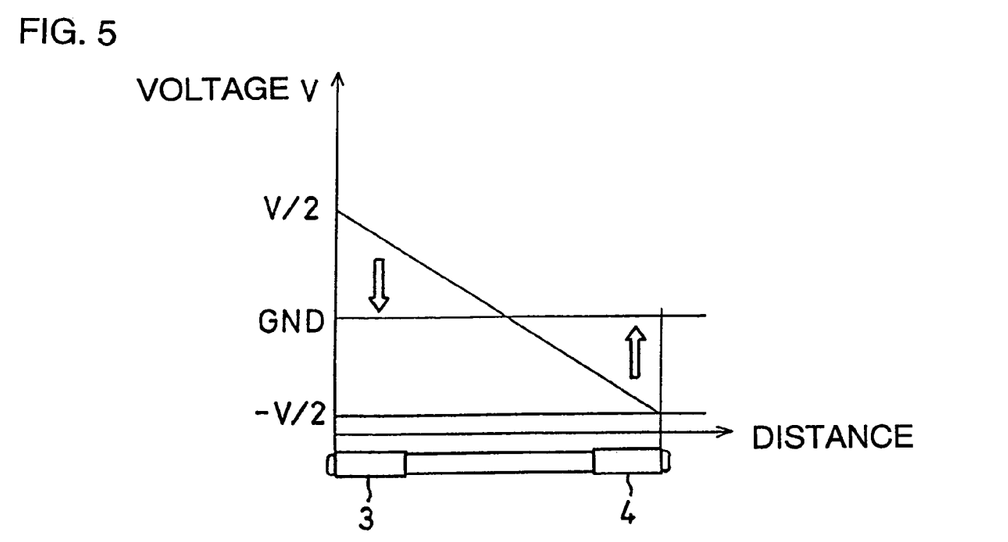
FIG. 5 is a graph showing the relation between electrode to electrode distance and a voltage for explaining an operation of the lighting device for dielectric barrier discharge lamp according to the present invention.

FIG. 4(A), (B) show output voltage waveforms of the first and the second high frequency power sources 5 and 6 respectively. As shown in the figures, these output voltage waveforms have the same amplitude and have phases different by 180° from each other. Assuming the amplitudes of the output voltages, the peak values, are V/2, +V/2 is applied on the electrode 3 and −V/2 is applied on the electrode 4 at the time t2 when these waveforms become the peak value. As a result, as shown in FIG. 5, the potential difference between the electrode 3 and 4 becomes V which is a necessary high voltage, while a ½ voltage of the peak voltage V is applied on each of the electrode 3 and the electrode 4, to make the potential at the center of the glass bulb 2 to be 0, that is, the GND level. Also in FIG. 4, at the time t1 when the output voltage waveform of the first and the second high frequency source 5 and 6 becomes 0 potential, the potentials of the electrode 3 and 4 become 0 and the potential difference between the two electrodes also becomes 0. Further, at the time t4 when the output voltage wave form of the first and the second high frequency power source 5 and 6 becomes another peak value, −V/2 is applied on the electrode 3 and +V/2 is applied on the electrode 4. As a result, the potential difference between the electrode 3 and 4 becomes V which is a necessary high voltage. In this way, in a both side high voltage lighting method of the present invention, the potential difference between the electrode 3 and 4 varies like a sine wave voltage which alternates with an amplitude V and with the same frequency as that of the output voltage waveform of the first and the second high frequency power source 5 and 6. However, the voltage applied on each of the electrode 3 and 4 is a sine wave voltage with an amplitude of V/2.

For this reason, the applied potential on the electrode 3 and 4 becomes ½ of necessary lighting voltage when compared with the conventional one side high voltage lighting method, and thus the leakage current is decreased to less than half. Therefore, the luminance slope between the electrode 3 and 4 along the glass bulb 2 hardly exists, and a luminance distribution of nearly uniform can be obtained.

Concerning the embodiment described above, a more specific example will be explained. A dielectric barrier discharge lamp was prepared by providing a 3-wavelength phosphor film of 20 mm thick on the inner surface of the straight tubular glass bulb 2 with the inner diameter of 2.0 mm, the outer diameter of 2.6 mm, and the length of 350 mm composed of borosilicate glass. On the outer surface of the glass bulb 2, an aluminum tape of 0.1 mm thick and 20 mm wide is arranged wound along the circumference direction to form the electrodes 2 and 3. As an enclosure gas, a mixed gas having a composition of neon/argon=90 mol %/10 mol % with enclosing pressure of 60 Torr, was used and 3 mg mercury was mixed. A high frequency power source 5 and 6 were used, each having 2500 Vrms voltage and 45 KHz frequency and generating sine wave output voltages having 180° different phases by 180° from each other. When the output voltages of these high frequency power source 5 and 6 were applied on the electrodes 3 and 4 respectively and a current of 10 mA flowed through the dielectric barrier discharge lamp 1 lighting. For comparison, a lighting device according to the conventional single side high voltage lighting method shown in FIG. 1 was used, where a sine wave output voltage having 2500 Vrms voltage and 45 KHz frequency was applied on the electrodes 3 and 4 from the power source 5. The lamp current was 5 mA. In the dielectric barrier discharge lamp according to the present invention compared with the conventional dielectric barrier discharge lamp, a high luminance light emission can be obtained having a twice as large discharge current as conventional one using a power source providing the same output voltage as that of the conventional one. The luminance slope found in conventional dielectric barrier discharge lamp was not found at all. This fact indicates that, the dielectric barrier discharge lamp according to the present invention can reduce the output voltage of the high frequency source 5 and 6 to a half, that is, 1225 Vrms, to be operated using the same discharge current as of the conventional dielectric discharge lamp. Thus, it is able to prevent the luminance slope by reducing the leakage current.

Figure 6:
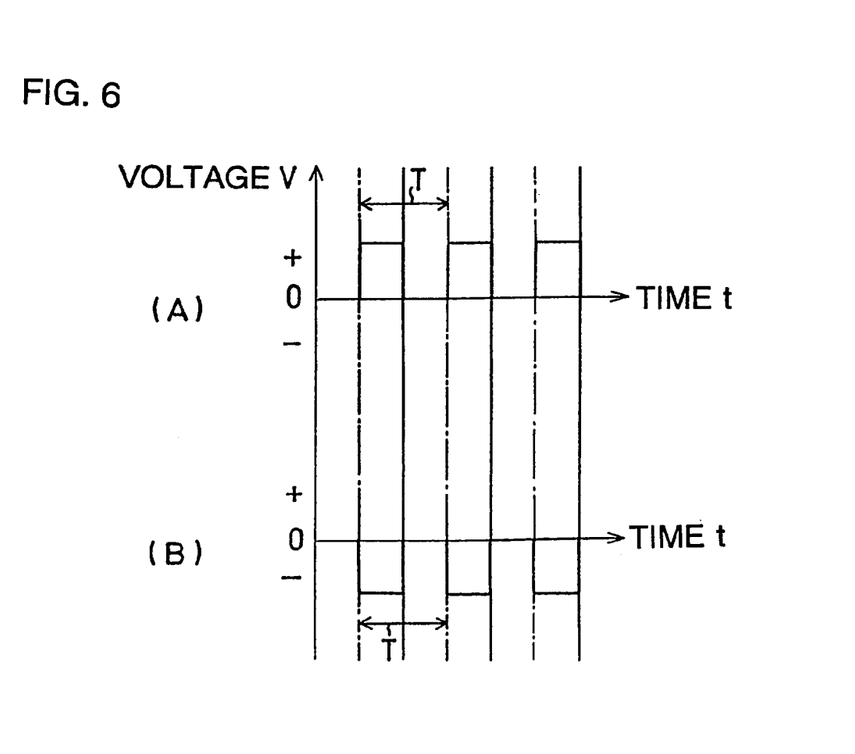
FIG. 6 shows a waveform of the output voltage of the high frequency source according to another embodiment of the present invention.

FIG. 6 shows another voltage wave forms supplied from the first and the second power sources 5 and 6. These waveforms have the same repetition cycles T and are pulse voltage waveforms having opposite polarities to each other. When these pulse voltages are-supplied to the electrodes 3 and 4 respectively, the same effect as the sine wave source shown in FIG. 4 is obtained.

Figure 7:
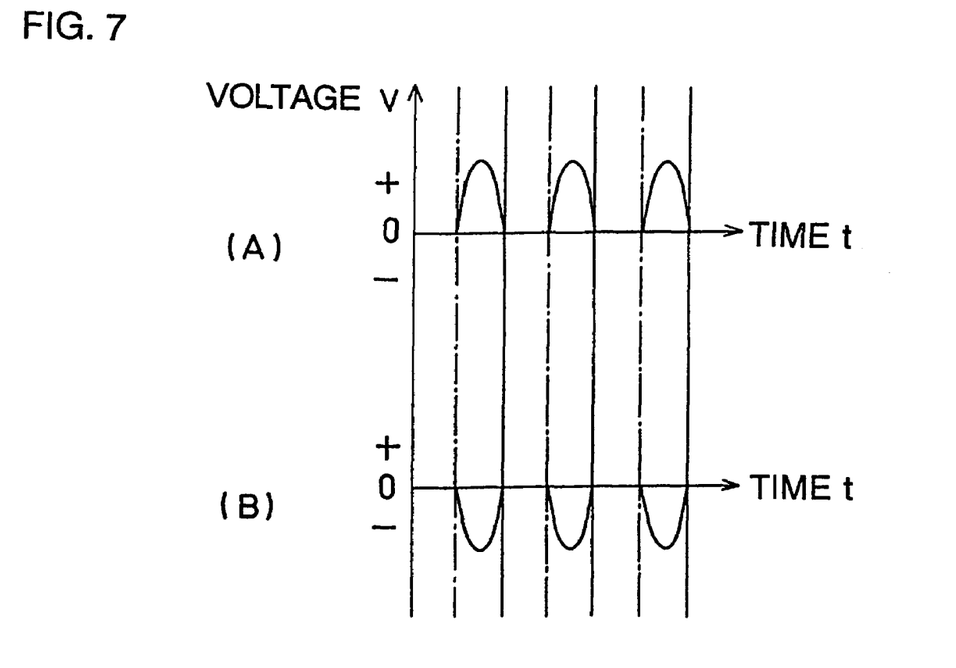
FIG. 7 shows waveforms of the output voltage of the high frequency source showing the relation between electrode to electrode distance and voltage to explain the operation of the lighting device for dielectric barrier discharge lamp according to the further different embodiment of the present invention.
Figure 8:
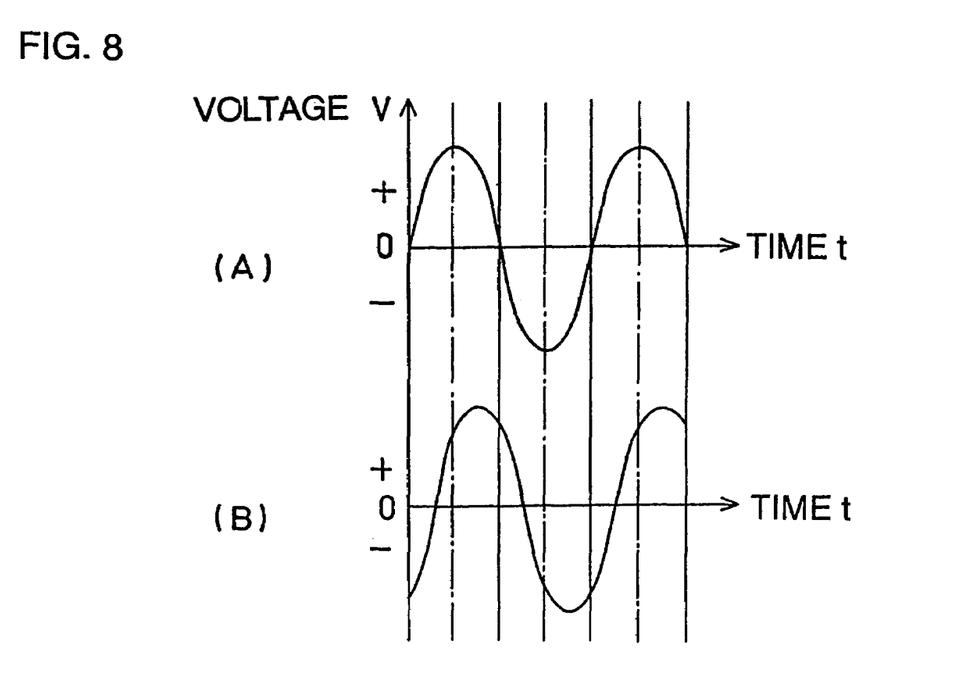
FIG. 8 shows waveforms of an output voltage of the high frequency source showing the relation between electrode to electrode distance and voltage to explain the operation of the lighting device for dielectric barrier discharge lamp according to the further different embodiment of the present invention.
Figure 9:
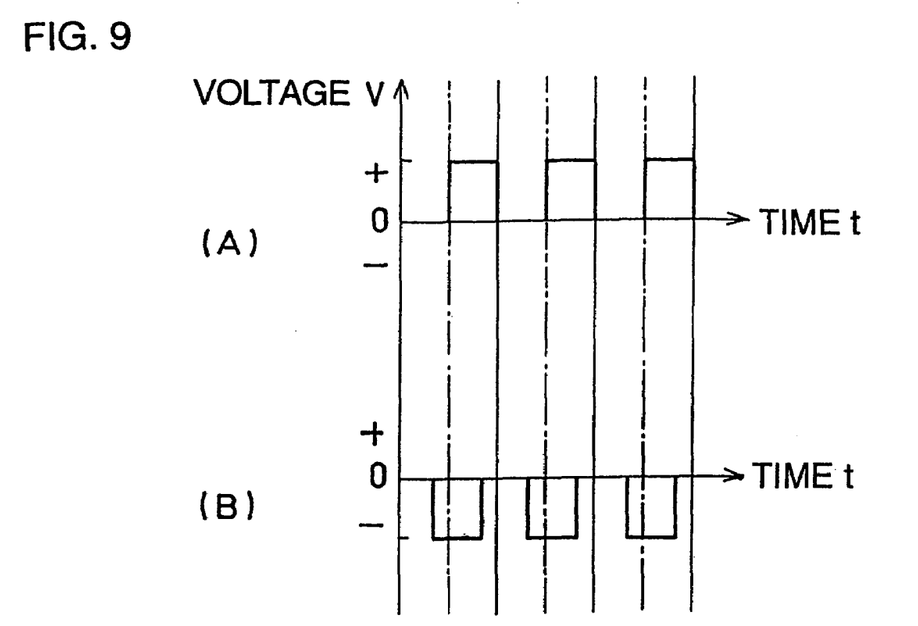
FIG. 9 shows waveforms of an output voltage of the high frequency source according to the further different embodiment present invention.
Figure 10:
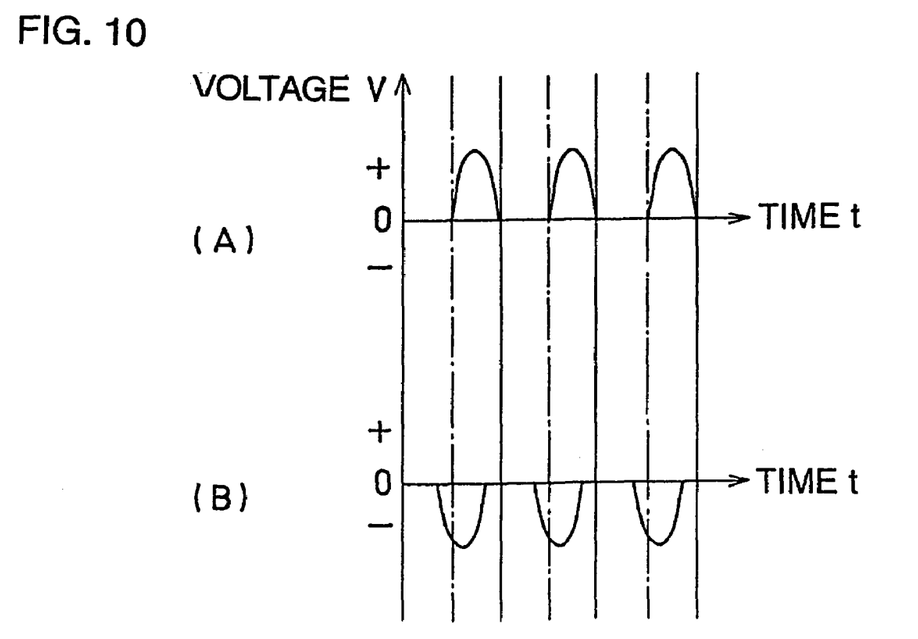
FIG. 10 shows waveforms of the output voltage of the high frequency source according to the further different embodiment the present invention.

FIG. 7 shows yet other different voltage waveforms supplied from the first and the second sources 5 and 6. These waveforms have a rectified half waveform of a sine wave instead of the pulse waveform shown in FIG. 6, and have the same phases but opposite polarities to each other. When these half-wave voltages are supplied to the electrodes 3 and 4, respectively, the same effect as in the sine wave voltage or pulse voltage shown in FIG. 4 or FIG. 6 is obtained. Each output voltage waveforms of the first and the second sources 5 and 6 shown in FIG. 4, FIG. 6, and FIG. 7 have phases different by 180° or 0° with each other, but this relation is not always necessary. That is, the waveforms shown in FIG. 8 have a phase difference lagging of 180° compared with those in FIG. 4 with each other. The more the phase lags from 180°, the higher than V/2 the voltage supplied to the electrodes 3 and 4 becomes. It can be, however, kept lower than the potential V which is supplied in one side high voltage lighting method. The pulse waveforms shown in FIG. 9 have a phase difference lagging from 0° compared with the waveforms in FIG. 6. However, if two pulse voltage waveforms have opposite polarities to each other in the same time period, the same effect as in the waveform shown in FIG. 6 is obtained. The rectified half waveforms shown in FIG. 10 have a phase difference lagging from 0° compared with that of FIG. 7. However, if two half-wave rectified voltage waveforms have opposite polarities to each other in the same time period, the same effect as in the waveform shown in FIG. 7 is obtained.

Further, the two voltage waveforms shown in FIG. 4 and FIG. 6 to FIG. 10 do not need to have the same peak values. In this case, the voltage supplied on the electrodes 3 and 4 become higher than V/2, but can be kept lower than the potential V which is supplied by one side high voltage lighting method.

Figure 11:
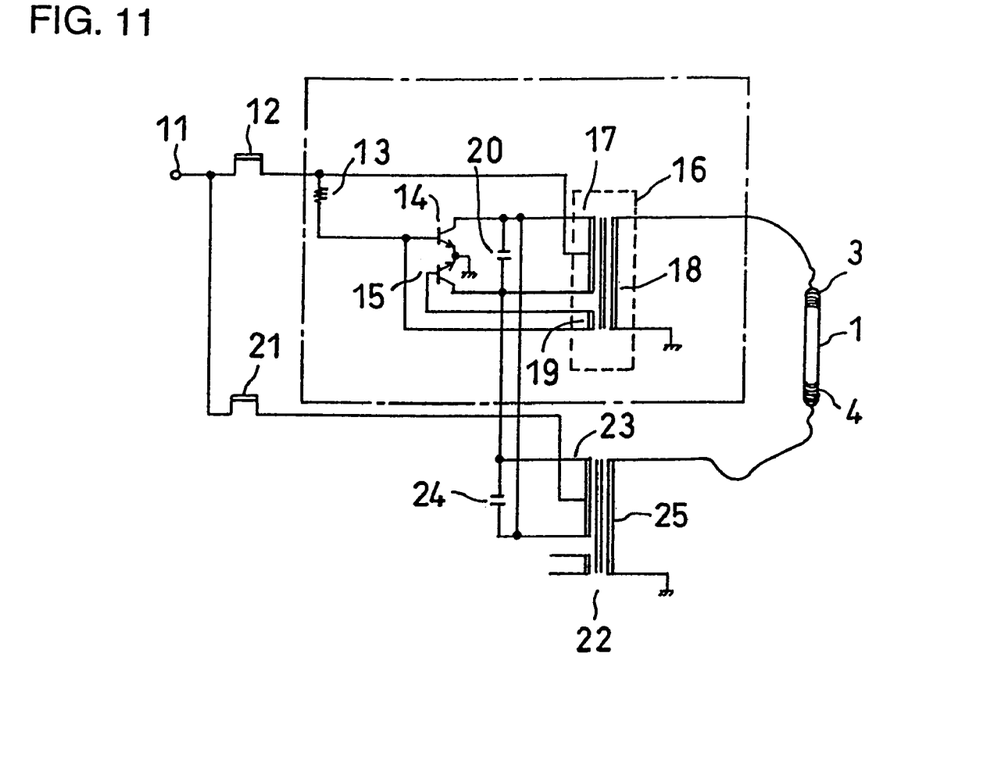
FIG. 11 is a circuit diagram showing a lighting device for a dielectric barrier discharge lamp according to the further different embodiment of the present invention.

FIG. 11 is a circuit diagram showing another embodiment of the lighting device for a dielectric barrier discharge lamp according to the present invention. This lighting device is composed of resonance type Royer inverter circuit utilizing self-excited oscillation. On the input terminal 11, a DC voltage is supplied from a DC source (not illustrated). The DC voltage is supplied to the base electrode of the transistor 14 composing the inverter circuit through inductance 12 and resistor 13 in series. The inductance 12 is composed of a choke coil which keeps the input current flowing into the inverter circuit constant. The inverter circuit is provided with another transistor 15, the emitter electrode of which is connected with the GND potential together with that of the transistor 14. The collector electrodes of the transistors 14 and 15 are connected with the both ends of the primary coil 17 of the inverter transformer composing the inverter circuit respectively. In this case, the collector electrode of the transistor 14 is connected with the positive side of the primary coil 17, while the collector electrode of the transistor 15 is connected with the negative side of the primary coil 17. One end of the secondary coil 18 of the inverter transformer is connected with the GND, the other end is connected with the electrode 3 of the dielectric barrier discharge lamp 1. The inverter transformer 16 is also provided with a tertiary coil 19. Both ends of this tertiary coil 19 are connected with the base electrodes of the transistors 14 and 15 respectively to feedback the voltage produced in the tertiary coil 19 to the bases of the transistors 14 and 15. Between the both ends of the primary coil 17 of the inverter transformer 16, a capacitor 20 is connected which composes an LC resonance circuit together with the inductor component of the inverter transformer. The DC voltage supplied from the input terminal 11 is also supplied to a center tap of the primary coil 17 of the inverter transformer 16 through the inductance 12.

The DC voltage supplied from the input terminal 11 is connected with a center tap of a primary coil 23 of a second inverter transformer 22 through an inductance 21. One end of the positive side of the primary coil 23 is connected with the collector electrode of the transistor 15. While, the one end of the negative side of the primary coil 23 is connected with the collector electrode of the transistor 14. That is, the primary coil 17 of the first inverter transformer 16 and the primary coil 23 of the second inverter transformer 22 are connected to have opposite polarities to each other with respect to the collector output voltages of the transistors 14 and 15. Between the both ends of the primary coil 23 of the second inverter transformer 22, a second capacitor 24 for resonance are connected, which composes an LC resonance circuit together with the inductance component of the second inverter transformer 22. While one end of the secondary coil 25 of the second inverter transformer 22 is connected with the GND, the other end is connected with the other electrode 4 of the dielectric barrier discharge lamp 1.

Next, the operation of the lighting device for a dielectric discharge lamp thus composed will be explained. When the DC voltage is applied to the input terminal 11, a current flows in the primary coil 17 of the first inverter transformer 16 through the inductor 12. At the same time, the DC voltage applied on the input terminal 11 is applied to the base of the transistor 14 through the resistor 13. This input voltage is amplified by the transistor 14 and the amplified output current is supplied to the primary coil 17 of the first inverter transformer 16. This output current resonates, in the resonance circuit composed of the reactance of the first inverter transformer 16 and the resonance capacitor 20, with the frequency determined by these L, C value to induce a voltage between the terminals of the tertiary coil 19 of the inverter transformer 16. The induced voltage is a voltage corresponding to the turns ratio of the primary coil 17 and the tertiary coil 19 of the inverter transformer 16. At this time, in the tertiary coil 19 of the inverter transformer 16, a current flows in the same direction as that of the primary coil 17 and this current is input in the base electrodes of the transistor 14 and 15 originating a self-excited oscillation. As a result, these transistors 14 and 15 are turned ON alternately at the resonance frequency. The oscillation frequency at this time is determined by the reactance of the primary coil 17 and the tertiary coil 19 of the inverter transformer 16, the capacitor 20 for resonance, and the reactance component fed back from the secondary coil of the inverter transformer 16. Also, the output voltage of the inverter circuit is raised with the turns ratio of the primary coil 17 and the secondary coil 18 of the inverter transformer 16 and an AC voltage having the resonant frequency is output. This AC voltage is output between the secondary coil 18 of the first inverter transformer 16 and the secondary coil 25 of the second inverter transformer 22. Here, the AC voltage waveform being output from the secondary coil 18 of the first inverter transformer 16 and the AC voltage waveform being output from the secondary coil 25 of the second inverter transformer 22 have the inverted phases with each other. Therefore, a voltage potential equals to the sum of each of these AC voltage amplitudes, is supplied between a pair of electrodes 3 and 4 of the dielectric barrier discharge lamp 1. In other words, it is possible to light a discharge lamp free from the luminance slope caused by a leakage current by using an inverter circuit generating a voltage equal to a half of the voltage necessary for the lighting the dielectric barrier discharge lamp 1.

Figure 12:
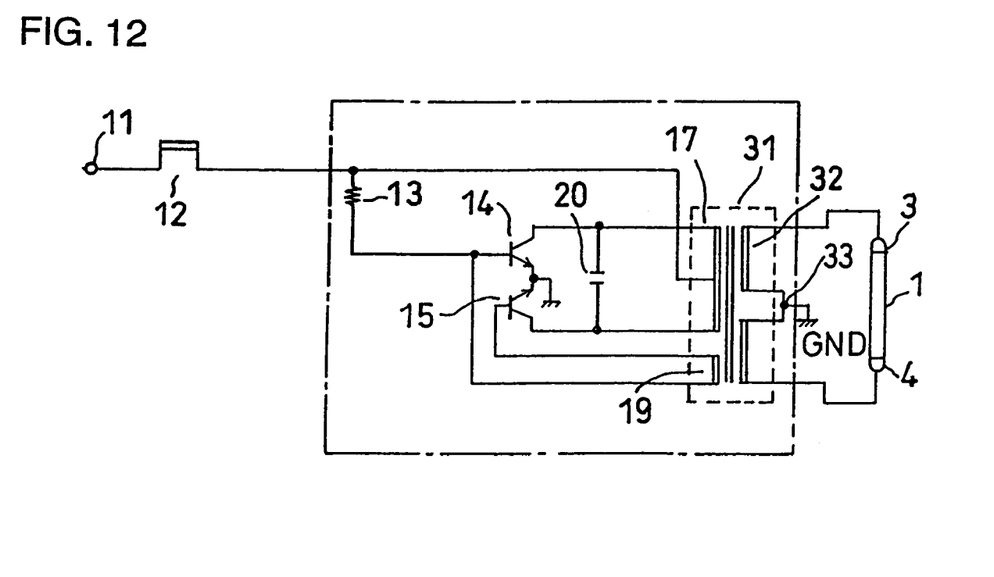
FIG. 12 is a circuit diagram showing a lighting device for a dielectric barrier discharge lamp according to the further different embodiment of the present invention.

FIG. 12 is a circuit diagram showing other embodiment of the lighting device for a dielectric discharge lamp according to the present invention. The lighting device of the present embodiment is also composed of a resonance type Royer inverter circuit utilizing a self-excited oscillation similar to the embodiment shown in FIG. 11. In the present embodiment, however, the second inverter transformer 22 in the embodiment of FIG. 11 is omitted. Except for this point, both embodiments have nearly same circuit composition. For this reason, in FIG. 12, explanation is omitted by assigning the same symbols to the parts corresponding to those in FIG. 11 and only the differing portions are explained below.

The inverter transformer 31 is a so-called 1-input 2-output transformer, the second coil 32 of which has a center tap 33 connected with the GND. This secondary coil 32 is wound in such a way that the both coils have opposite winding directions with each other in the both sides of the center tap 33, and each of the coils has more turns than that of the primary coil 17 to raise the voltages. With this configuration, two voltage waveforms having phases difference of 180° from each other and having raised voltages are obtained at the two output ends of the secondary coil 32.

These output voltages are applied on the both electrodes 3 and 4 of the dielectric barrier discharge lamp 1, so that the discharge lamp 1 can be driven for lighting at a higher voltage than any of the amplitude of these voltages, in a similar manner with the case in FIG. 11. Here, the primary coil 17 and the tertiary coil 19 of the inverter transformer 31 have the same composition as the inverter transformer 16 shown in FIG. 11.

By using the 1-input 2-output type transformer for the inverter transformer 31, the primary sides of the transformer 31 are commonly used completely and stability is improved because the core volume increases, compared with the case of using two transformers shown in FIG. 11.

Figure 13:
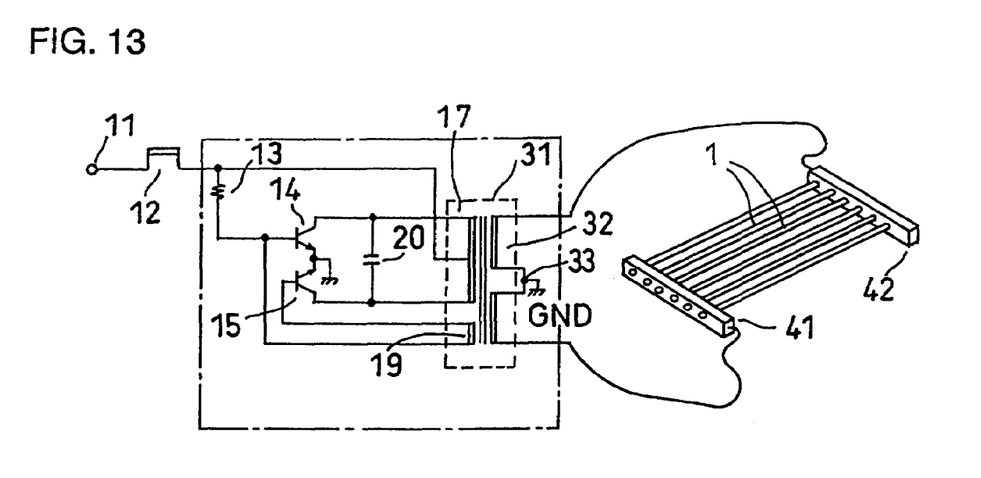
FIG. 13 is a circuit diagram showing a lighting device for a dielectric barrier discharge lamp according to the further different embodiment of the present invention.

FIG. 13 is a circuit diagram showing other embodiment of the lighting device of a dielectric barrier discharge lamp according to the present invention. In the embodiment, a plurality of the dielectric barrier discharge lamps 1 are driven in parallel by the lighting device shown in FIG. 12. On both ends of the plurality of dielectric discharge lamps 1 arranged in parallel, the electrodes 41 and 42 composed of a pair of bar shape electric conductive silicone rubber are provided which are arranged parallel to the direction perpendicular to the plurality of the dielectric barrier discharge lamps 1. The both ends of a plurality of the dielectric barrier discharge lamps 1 are inserted into a plurality of holes formed in the electric conductive silicone rubber electrodes 41 and 42. A pair of bar shape electrodes 41 and 42 are connected with the both ends of the secondary coil 32 of the inverter transformer 31 at the opposite ends of 41 and 42.

The electrodes 41 and 42 contact firmly with the outer surface of lamp bulb forming the dielectric barrier discharge lamp 1 with elasticity of the electric conductive silicone rubber to form outer electrodes for mutually connecting with the both ends of a plurality of dielectric barrier discharge lamps 1. Thus, the plurality of dielectric barrier discharge lamps 1 are connected with the secondary coil 32 of the inverter transformer 31 in parallel.

With the lighting device according to the embodiment of the present invention thus composed, the electrodes formed by aluminum tape wound around the outer surface of the lamp bulb can be omitted, which have been generally used in the conventional dielectric barrier discharge lamps of this kind. Also with this device, a relay board, lead wire, or electric conductive metal fittings are not needed, which were necessary in the past for the simultaneous driving of the plurality of dielectric barrier discharge lamps of this kind, so that the arrangement of the electrode portion can be extremely simplified.

Since the pair of bar shape electrodes 41 and 42 are, connected with the both ends of the secondary coil 32 of the inverter transformer 31 at their opposite ends, the potential difference owing to the resistance of electric conductive silicone rubber is cancelled. As a result, substantially equal voltages are applied to the plurality of dielectric barrier discharge lamps. For this reason, there is an advantage that lamp currents do not vary from one discharge lamp to another, so that all the discharge lamps can be lighted with nearly uniform luminance.

Figure 14:
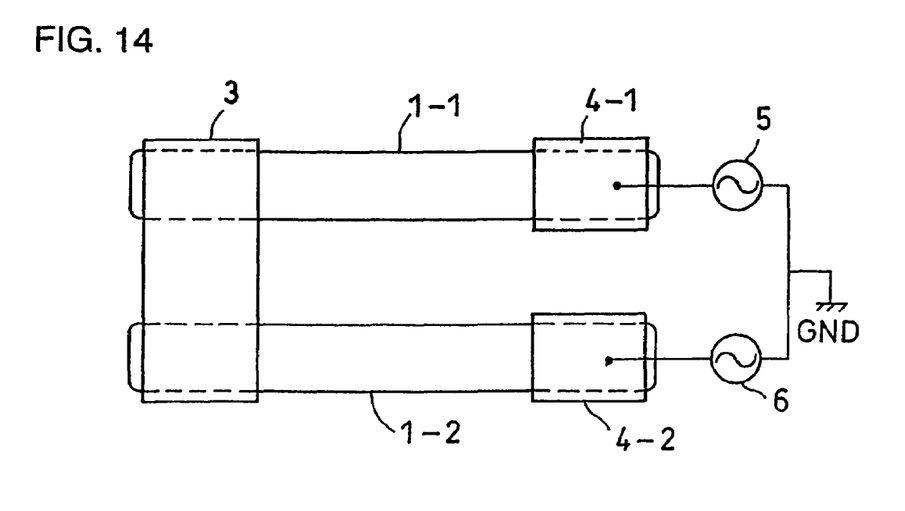
FIG. 14 is a circuit diagram showing a lighting device for a dielectric barrier discharge lamp according to the further different embodiment of the present invention.

FIG. 14 is a circuit diagram showing still other embodiment of the lighting device for a dielectric barrier discharge lamp according to the present invention. In the embodiment, two dielectric barrier discharge lamps 1-1 and 1-2 are driven, which are connected in series with each other. On the one end of these discharge lamps 1-1 and 1-2, a common electrode 3 is provided and electrodes 4-1 and 4-2, which are independent from each other, are provided on the other ends. Terminals on a high voltage side of the high frequency source 5 and 6 are connected with the independent electrodes 4-1 and 4-2 respectively. The terminal on a low voltage side of these high frequency source 5 and 6 are connected with the GND in the same manner as in the embodiment shown in FIG. 3., Specifically, an inverter circuit shown in FIG. 11 and FIG. 12 is used for these high frequency sources 5 and 6. An electric conductive silicone rubber electrode 41 or 42 shown in FIG. 13 can be used for a common electrode 3. Here, the electrodes 4-1 and 4-2 may be constructed by the aluminum tape wound around the outer surface of the lamp bulb as are generally used for the conventional dielectric barrier discharge lamp of this kind.

With the present invention, in which a required high voltage output is supplied to a dielectric barrier discharge lamp using a high frequency source of low output voltage, a lighting device for a dielectric barrier discharge lamp can be provided, which prevents the luminance slope caused by a leakage current in high voltage driving, and which provides a sufficient and nearly uniform luminance along the tube axis of the lamp bulb.

The invention claimed is:

1. A lighting device for a dielectric barrier discharge lamp comprising:
   a dielectric barrier discharge lamp having a lamp bulb inside which a discharge gas is enclosed and a pair of electrodes is formed on an outer surface of both ends of the lamp bulb, and
   a first and a second high frequency voltage sources each of which is connected between one of the electrodes and a ground potential,
   wherein the first and the second high frequency voltage sources respectively supply the electrodes with a first and a second high frequency voltage having different phases with each other.

2. The lighting device for a dielectric baffler discharge lamp according to claim 1, wherein the first and the second high frequency voltages are sine wave voltages of the same frequency.

3. The lighting device for a dielectric barrier discharge lamp according to claim 2, wherein the first and the second high frequency voltages have the same periods, different polarities with each other, and the same amplitudes.

4. The lighting device for a dielectric barrier discharge lamp according to claim 1, wherein the first and the second high frequency voltage sources are composed of an inverter circuit having an input of a DC source.

5. The lighting device for a dielectric barrier discharge lamp according to claim 4, wherein the inverter circuit comprises:
   a switching circuit to which a DC voltage is supplied from the DC source,
   first inverter transformer having a primary coil to which an output of the switching circuit is supplied, a secondary coil one end of which is connected with the ground potential, and a tertiary coil generating a feedback signal to an input side of the switching circuit, and
   a second inverter transformer having a primary coil to which an inverted output of the switching circuit is supplied and a secondary coil one end of which is connected with the ground potential,
   wherein the first and the second high frequency voltages are supplied from the other ends of the secondary coil of the first and the second inverter transformers, which are AC voltages having inverted phases with each other.

6. The lighting device for a dielectric barrier discharge lamp according to claim 5, wherein a phosphor film is provided on the inner surface of the lamp bulb, wherein the pair of electrodes formed on the outer surface of both ends of the lamp bulb is connected to an output terminal of the secondary coil of the first and second inverter transformers.

7. The lighting device for a dielectric barrier discharge lamp according to claim 1, wherein the first and the second high frequency voltages are the pulse waveform voltages having the same frequencies.

8. The lighting device for a dielectric barrier discharge lamp according to claim 7, wherein the first and the second high frequency voltages have inverted polarities with each other.

9. The lighting device for a dielectric barrier discharge lamp according to claim 5, wherein the dielectric barrier discharge lamps are composed of a plurality of dielectric barrier discharge lamps connected in parallel or in series with each other.

10. The lighting device for a dielectric barrier discharge lamp according to claim 9, wherein the plurality of dielectric barrier discharge lamps are arranged parallel with each other, the both ends are supported by being inserted into the electrodes which are composed of a pair of electric conductive silicone rubber and arranged by extending across the tube axis direction of the dielectric barrier discharge lamps, the pair of electrodes composed of electrically conductive silicone rubber are connected with the output ends of the secondary coil of the inverter transformer respectively.

11. The lighting device for a dielectric barrier discharge lamp according to claim 10, wherein the electrodes composed of a pair of electrically conductive silicone rubber, which are arranged extending across tube axis direction of the dielectric barrier discharge lamps, are connected with the output ends of the secondary coil of the inverter transformer at the opposite ends in their extended direction.

12. The lighting device for a dielectric barrier discharge lamp according to claim 11, wherein a phosphor film is provided on the inner surface of the lamp bulb.

13. The lighting device for a dielectric barrier discharge lamp according to claim 2, wherein the first and the second high frequency voltage sources are composed of an inverter circuit having an input of a DC source.

14. The lighting device for a dielectric barrier discharge lamp according to claim 13, wherein the inverter circuit comprises:
a switching circuit to which a DC voltage is supplied from the DC source,
a first inverter transformer having a primary coil to which an output of the switching circuit is supplied, a secondary coil one end of which is connected with the ground potential, and a tertiary coil generating a feedback signal to an input side of the switching circuit, and
a second inverter transformer having a primary coil to which an inverted output of the switching circuit is supplied and a secondary coil one end of which is connected with the ground potential,
wherein the first and the second high frequency voltages are supplied from the other ends of the secondary coil of the first and the second inverter transformers, which are AC voltages having inverted phases with each other.

15. The lighting device for a dielectric barrier discharge lamp according to claim 14, wherein a phosphor film is provided on the inner surface of the lamp bulb, wherein the pair of electrodes formed on the outer surface of both ends of the lamp bulb is connected to an output terminal of the secondary coil of the first and second inverter transformers.

16. The lighting device for a dielectric barrier discharge lamp according to claim 14, wherein the dielectric barrier discharge lamps are composed of a plurality of dielectric barrier discharge lamps connected in parallel or in series with each other.

17. The lighting device for a dielectric barrier discharge lamp according to claim 16, wherein the plurality of dielectric barrier discharge lamps are arranged parallel with each other, the both ends are supported by being inserted into the electrodes which are composed of a pair of electric conductive silicone rubber and arranged by extending across the tube axis direction of the dielectric barrier discharge lamps, the pair of electrodes composed of electrically conductive silicone rubber are connected with the output ends of the secondary coil of the inverter transformers respectively.

18. The lighting device for a dielectric barrier discharge lamp according to claim 17, wherein the electrodes composed of a pair of electrically conductive silicone rubber, which are arranged extending across tube axis direction of the dielectric barrier discharge lamps, are connected with the output ends of the secondary coil of the inverter transformers at the opposite ends in their extended direction.

19. The lighting device for a dielectric barrier discharge lamp according to claim 18, wherein a phosphor film is provided on the inner surface of the lamp bulb.

20. The lighting device for a dielectric barrier discharge lamp according to claim 3, wherein the first and the second high frequency voltage sources are composed of an inverter circuit having an input of a DC source.

21. The lighting device for a dielectric baffler discharge lamp according to claim 20, wherein the inverter circuit comprises:
a switching circuit to which a DC voltage is supplied from the DC source,
a first inverter transformer having a primary coil to which an output of the switching circuit is supplied, a secondary coil one end of which is connected with the ground potential, and a tertiary coil generating a feedback signal to an input side of the switching circuit, and
a second inverter transformer having a primary coil to which an inverted output of the switching circuit is supplied and a secondary coil one end of which is connected with the ground potential,
wherein the first and the second high frequency voltages are supplied from the other ends of the secondary coil of the first and the second inverter transformers, which are AC voltages having inverted phases with each other.

22. The lighting device for a dielectric barrier discharge lamp according to claim 21, wherein a phosphor film is provided on the inner surface of the lamp bulb, wherein the pair of electrodes formed on the outer surface of both ends of the lamp bulb is connected to an output terminal of the secondary coil of the first and second inverter transformers.

23. The lighting device for a dielectric barrier discharge lamp according to claim 21, wherein the dielectric barrier discharge lamps are composed of a plurality of dielectric baffler discharge lamps connected in parallel or in series with each other.

24. The lighting device for a dielectric barrier discharge lamp according to claim 23, wherein the plurality of dielectric barrier discharge lamps are arranged parallel with each other, the both ends are supported by being inserted into the electrodes which are composed of a pair of electric conductive silicone rubber and arranged by extending across the tube axis direction of the dielectric barrier discharge lamps, the pair of electrodes composed of electrically conductive silicone rubber are connected with the output ends of the secondary coil of the inverter transformers respectively.

25. The lighting device for a dielectric barrier discharge lamp according to claim 24, wherein the electrodes composed of a pair of electrically conductive silicone rubber, which are arranged extending across tube axis direction of the dielectric baffler discharge lamps, are connected with the output ends of the secondary coil of the inverter transformers at the opposite ends in their extended direction.

26. The lighting device for a dielectric barrier discharge lamp according to claim 25, wherein a phosphor film is provided on the inner surface of the lamp bulb.

* * * * *

UNITED STATES PATENT AND TRADEMARK OFFICE
CERTIFICATE OF CORRECTION

| | |
|---|---|
| PATENT NO. | : 7,271,546 B2 |
| APPLICATION NO. | : 10/483565 |
| DATED | : September 18, 2007 |
| INVENTOR(S) | : Hiroki Nakano |

It is certified that error appears in the above-identified patent and that said Letters Patent is hereby corrected as shown below:

Title Page, In References Cited (56), Foreign Patent Documents:
    Please delete "JP 1-134948" and insert --JP 1-134398--

In Claim 21, Column 12, Line 32:
    Please delete "baffler" and insert --barrier--

Signed and Sealed this

Twenty-seventh Day of May, 2008

JON W. DUDAS
*Director of the United States Patent and Trademark Office*